April 5, 1966   G. W. KÜHL   3,244,582
LIGHT TRANSMITTING CONSTRUCTION AND PROCESS
FOR ITS MANUFACTURE
Filed July 2, 1962
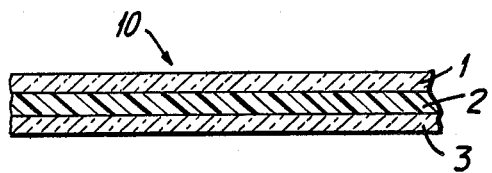
INVENTOR.
GEORG WALTER KÜHL
BY
*McGlew & Toren*
ATTORNEYS.

3,244,582
LIGHT TRANSMITTING CONSTRUCTION AND
PROCESS FOR ITS MANUFACTURE
Georg Walter Kühl, Willi Stamer-Strasse 11,
Munich-Grunwald, Germany
Filed July 2, 1962, Ser. No. 207,116
Claims priority, application Germany, July 4, 1961,
K 44,179
6 Claims. (Cl. 161—199)

This invention generally relates to light transmitting materials and is particularly directed to foils and sheets of synthetic material whose light permeability varies in dependence on the ambient atmosphere and/or the light intensity.

It is known in the art that certain synthetic resin-like compounds and predominantly partially acetalized polyvinyl alcohol complexes are responsive to temperature and/or light intensity and, in dependence on predetermined values thereof, transmit light to a reversibly varying extent. Thus, for example, polyvinyl alcohol complexes become opaque in response to high temperature or light intensity to filter out a portion of the light. Upon decrease of the temperature or light intensity, the opaqueness disappears, the change-over point between the two conditions being dependent on several factors. The phenomenon referred to is generally known as reversible thermal coagulation and is exhibited by certain water-containing materials or compounds. From a practical point of view, complex addition products of partially acetalized polyvinyl alcohol and water or water and certain inorganic hydrate salts, as for example, calcium chloride, are most suitable for the intended purpose. These addition compounds are reversibly decomposed in response to temperature and/or light variations into optically heterogenous components.

The varying light permeability of these polyvinyl alcohol complexes is largely dependent on the water content of the product. It has previously been attempted to prepare foil material from such polyvinyl alcohol addition products and to use the foils as synthetic glass for varying purposes. It is well known, however, that the characteristics of such foils with regard to their temperature- or light-responsive light permeability, are not permanent and that the foils, in fact, lose their acitvity within a short period of time. The reason for this is that in spite of the hygroscopic properties of the hydrate salts contained in the foils, the foils qiuckly lose their reactivity at relative air humidity values of between 30 to 70%, as they usually prevail in the atmosphere, because the partial pressure of the water vapor within the foils is so high that considerable amounts of water evaporate to the ambient atmosphere. The loss of water, in turn, affects the responsiveness of the foils to temperature or light intensity, so that the desired reversible opaqueness of the foils either does not take place at all or at least not within the desired temperature ranges.

It has been suggested to eliminate or at least to reduce the loss of water from the foil to the ambient atmosphere by placing the foil between silicate glass. Thus, multi-layer or laminated silicate glass structures are known which comprise an intermediate water-containing polyvinyl alcohol complex layer. Such structures, however, have many disadvantages, as they are complicated to manufacture, are subject to breakage, are heavy and generally do not function properly as, for example, the glass prevents condensation of water on the foil.

Accordingly, it is a primary object of this invention to provide a synthetic light transmitting foil which overcomes the disadvantages of the prior art and which, under the influence of heat and/or light intensity, exhibits a reversibly varying light permeability of permanent character.

Another object of this invention is to provide a foil structure of the kind referred to which is supported and protected on at least one side by a flexible or rigid cover layer of a high polymer material.

Generally, it is an object of this invention to improve on the art of light transmitting materials as hitherto practiced.

In accordance with this invention, it has surprisingly been ascertained that certain inorganic salts having the same cations but different anions exhibit an antagonistic action with regard to the light filtering effect of polyvinyl alcohol complexes. Thus, for example, if the polyvinyl alcohol complex contains lithium chloride, the change-over point referred to is considerably decreased while, by contrast, lithium bromide or lithium nitrate tend to raise the change-over point. The same holds true with regard to the corresponding salts of calcium and magnesium. By providing a mixture of easily soluble water-containing salts of different anions and adding this mixture to the polyvinyl alcohol, the salt concentration in the foil will reach a level at which the partial pressure of the water vapor contained in the foil is depressed to values which always will remain below the water vapor partial pressure of the ambient air. This means that the foil does not give off any water to the ambient atmosphere and the foil, therefore, remains permanently reactive. By suitably choosing the salt components of the salt mixture to be added to the polyvinyl alcohol, that is, by employing predetermined ratios of selected anions, the degree of light permeability and the change-over point at which the foil will change from transparency to opaqueness can be controlled and adjusted in any suitable manner. The water content of the foil will moreover be preserved and replenished by the condensation of the air moisture at the foil. Experiments have conclusively established that such condensation takes place even if the foil is enveloped by a flexible or rigid water vapor permeable high polymeric material. This high polymeric material should otherwise be resistant to atmospheric influences and should be insoluble in water. If the foil is thus covered or coated by such high polymeric layers on at least one side of the cover layer or layers not only mechanically protect the polyvinyl alcohol complex foil, but moreover act as a kind of buffer or regulator to compensate for rapid fluctuations in the moisture content of the foil.

Various mixtures of inorganic salts of lithium, calcium or magnesium may be used for the inventive purpose. It thus has been ascertained that the chlorides, bromides, iodides and nitrates of these metals in varying mixtures render excellent results.

In the event that the bromides and iodides are used, it is advisable to maintain a neutral or slightly alkaline pH in the foil for the purpose of preventing photo-chemical reactions. This, for example, may be accomplished by adding small amounts of borax, or lithium hydroxide or other alkaline substances to the polyvinyl alcohol complex. In choosing the alkali, however, care should be taken that the metals contained in the foil material do not precipitate with these alkalis.

With a view to preventing photo-oxidation reactions within the foil, certain reducing substances such as, for example, hydrazine, may be added. In preparing the foil, and particularly during mixing of the individual components, it is advantageous to operate in an inert gas atmosphere, as for example, in a nitrogen atmosphere.

The acetalation degree of the polyvinyl alcohol to be used for the inventive purpose is advantageously chosen so that the polyvinyl alcohol molecules contain a proportion of free hydroxyl groups (about 40 to 50%) sufficient to bind an amount of water and hydrate salt to the polyvinyl alcohol molecules in complex manner to insure that the water supply of the hydrates will suffice not to affect the reactivity of the foil, even in the event of very intense sunlight.

Foils of the inventive nature have many uses. If the foil is coated with a rigid plastic layer, it may function as synthetic glass of varying light permeability and thus presents an excellent replacement for known multi-layer silicate glass. Thus, such rigid foils may be used in the place of flat glass or plate glass for covering roofs, hot houses, building fronts, vehicle windows, etc. In the event that the foil is coated or covered with a flexible synthetic layer, the structure will fiind important use in agriculture and horticulture, for example, for protecting garden produce, for covering hot houses, particularly of portable nature, flower and vegetable beds, and the like.

For the purpose of coating the inventive foil material with a flexible cover or protecting layer, all light transmitting lacquers and varnishes can be used which are not appreciably influenced by weather conditions and which have a water vapor permeability which is sufficiently great to permit condensation of the air moisture at the hydrate salts of the foil. Thus, for example, cellulose acetate lacquers, lacquers on the basis of polyvinyl acetate, polyvinyl acetal, polyacrylic acid esters, mixed polymerization products of polyvinyl chloride and polyvinyl acetate, etc. are usable. For certain uses of flexible foil structures, for example, if the foil is to be used as cover of portable panels or frames for horticultural purposes or in portable hot houses, it is advantageous to coat the inventive foil on opposite sides with material or different water vapor permeability. In doing so, the water vapor permeability should be greater on that side of the foil which faces the growth in question, while the vapor permeability on the side facing the sun should be lower. In this manner, the foil, in the event that it should lose small amounts of water, is quickly regenerated, even after the most intense sun radiation, by absorbing moisture from the ground or soil bed. The foil side facing the sun is preferably coated with a layer which is chemically and mechanically extremely resistant. Thus, for example, polyterephthalic acid glycol ester may advantageously be used for this purpose. Obviously, dispersions of synthetic resins and the like synthetic compounds may be used for coating the foils.

It will also be realized that the coating of the foil may be performed in different manner. Thus, for example, it is not necessary that a coat or lacquer is applied to the foil, but in the reverse, the foil material, in liquid form, may be poured, sprayed, or otherwise applied on a support or carrier layer of synthetic material which will ultimately act as support or protecting cover for the foil once it has solidified. Thus, for example, the foil forming components, that is, the polyvinyl alcohol complex addition product may be dissolved in a suitable solvent or solvent mixture and the solution is then applied in any suitable manner, such as by pouring, spraying or centrifuging to a carrier of, for example, polyacrylic acid ester or polyterephthalic acid glycol ester.

Polyvinyl alcohol complexes of a relatively low acetalization degree of the polyvinyl alcohol may, if sufficiently cooled, simply be dissolved in water to form a highly viscous solution. This viscous solution may then be extruded by a strongly cooled extrusion press and the mass exiting through the extrusion nozzle will be directed onto a flexible water vapor permeable carrier or support to form a foil layer thereon. The structure thus obtained may then be coated on the other side of the foil layer with the same or a different carrier material, or for example, by placing a thin foil on the free side of the polyvinyl alcohol containing material.

The extruded mass, however, may be processed in different ways as well. For example, the mass, upon discharge from the extrusion nozzle, may be coagulated by heat action and may thereafter be combined with a cover or protecting carrier, for example, by passing the coagulated mass and the protecting carrier through the nip of a pair of rollers. Another possibility of coating or covering the reactive light sensitive material is to prepare a strongly cooled aqueous solution of the polyvinyl alcohol complex and either to centrifuge this solution onto a carrier foil or to spray it onto the carrier foil mechanically or in electrostatic manner. The product thus obtained is then dried, for example, in the centrifuge, and may be additionally varnished or lacquered. Experience has shown that coated foils of the polyvinyl alcohol complex prepared in a centrifuge are particularly advantageous because by specifically shaping the contact surface between foil and coating, for example, by providing depressions in this surface of a predetermined pattern, certain desired optical effects can be obtained when the reactive foil component becomes opaque.

A particularly advantageous embodiment of a coated foil structure which can be used for many different purposes, resides in covering the reactive foil on one side with a coat or layer which is permeable to water vapors and which is removable from the reactive foil proper. Thus, for example, the protective layer may be united or bonded to the reactive foil adhesively in the manner of contact paper so that the protective layer can be pulled off when the reactive foil is to be used. Thus, after the protective cover has been removed, the reactive foil may be applied to silicate glass or organic glass, for example, to the panes of hot houses or glass structures for covering flower and vegetable beds. Polymethacrylic acid methyl ester is a suitable example for organic glass to be used in this invention. Such contact foils comprising a reactive foil adhesively united with a cover layer are suitable also for application to the roofs and windows of vehicles, such as buses, in which event the adhesive capacity of the reactive foil may be increased by admixture of viscosity increasing substances as, for example, sodium acetate or borax. Of course, various modifications of this basic structure are possible. Thus, for example, the reactive foil may on one side be permanently united with a carrier which, in turn, has an adhesive outer coat covered with a removable outer layer so that upon removal of the outer layer, the adhesive coat can be applied to any suitable base such as glass or panels of synthetic resins.

As previously mentioned, the reactive foil may be applied to both rigid and flexible protective layers. If the layer is rigid, it may consist of any suitable transparent thermoplastic or hardenable polymeric material. Polymeric materials are customarily permeable to water vapors, at least to a small extent. As examples for such polymeric compounds, methacrylic acid methyl ester, allyl resins, unsaturated polyester resins and epoxy resins may be mentioned. These resins, in turn, may be reinforced by glass fibers or other reinforcing means. Such structures again may be prepared in many different ways. For example, the reactive foil may be incorporated into the rigid layer during its manufacture. Thus, for example, the reactive foil may be positioned in the reaction vessel during the polymerization of the resin so that the final product obtained comprises the reactive foil as an integral component of the resin structure. In order to prevent any reaction between the rigid cover layers and the reactive foil, it is oftentimes suitable to provide the reactive foil with a coat of hydrophilic substances as, for example, polyvinyl alcohol, polyvinyl pyrrolidone or gelatin. In this manner, any adverse effect caused by the coating material is effectively prevented as there will be no direct contact between the reactive foil and the coat.

Thermoplastic resins, provided they are soluble, may also be applied to the reactive foil in dissolved form or in the form of dispersions and the liquid medium is then applied to the reactive foil by simply pouring the solution thereon. Thus, for example, methacrylic acid ester in a mixture of ethyl acetate and butyl acetate may, in liquid form, be applied to the reactive foil. In the reverse, of course, a solution of the polyvinyl alcohol complex may be applied to the rigid cover layer in any desired manner, for example, according to the procedures described in connection with the preparation of flexible foil structures.

It will also be realized that the reactive foils, irrespective of the manner by which they have been prepared, can also be combined with panes or sheets of organic glass or the like carriers by means of a mechanical press or in an autoclave under pressure. A solution of the polyvinyl alcohol complex may also be incorporated into hardenable resin mixtures which are then hardened, for example, by polymerization. Further, the foils may be combined with glass fiber or synthetic resin structures, as for example, styrene or polyvinyl chloride, in any suitable manner known per se.

In the drawings, the figure is a cross section through one embodiment of an inventive foil structure.

Referring now to the figure, the reactive foil is indicated by reference numeral 2 and consists of a polyvinyl alcohol complex in accordance with this invention. The foil is covered on both sides by a rigid or flexible protecting layer 1 and 3, the layers being transparent and of suitable synthetic material such as polyacrylic acid ester. At least one of the layers is permeable to water vapor. The reactive foil 2 thus constitutes an intermediate layer and the entire foil structure generally referred to by reference numeral 10 forms an entity suitable as window glass for vehicles, hot houses, or the like.

While specific embodiments of the invention have been shown and described in detail to illustrate the application of the inventive principles, it will be understood that the invention may be embodied otherwise without departing from such principles.

Some embodiments of the invention are described in the following examples, it being understood, however, that these examples are given by way of illustration and not by way of limitation and that many changes can be effected without affecting the scope and spirit of the invention as recited in the appended claims. According to the inventive principle it is essential that the hydrate salts (=salts with a content of water bound in complex manner, the amount of such water being dependent on the temperature) are present in such a concentration in the hemiacetal that their water vapor partial pressure is lower than the normal water vapor partial pressure of the atmosphere without such On the other hand decomposition of the acetal complex and resulting formation of milk-like color take place owing to the high salt-concentration at a normal temperature (20° C. to about 30° C.) which, according to the invention is attained by way of compositions of hydrate salts with different anions. The degree of acetalization of the polyvinylalcohol can likewise be varied within certain limits, from which result possibilities of numerous further variations.

*Execution Example 1*

10 parts by weight of polyvinylalcohol (saponification number 28 mg. KOH/g., viscosity 120 sec., measured by a solution of 10% in the Ford cup at a temperature of 20° C. are dissolved in 90 parts by weight of hot water. The solution is then brought up to a temperature of 19° C., mixed with 160 parts of acetaldehyde and 60 parts 1/1 N hydrochloric acid and stirred intensively for 10 minutes. The acetalization is then interrupted by neutralization of the catalyst, i.e. by adding 60 parts by weight of soda lye and the acetalization product already partly precepitated is then completely precipitated by an addition of hot water (90° C.) and washed out with hot water until the chlorine reaction as well as the remaining acetaldehyde have disappeared. The hemiacetal thus obtained (degree of acetalization about 50%) with complex bound water can be represented perhaps by the following formula, which shows the elements of structure of the acetal:

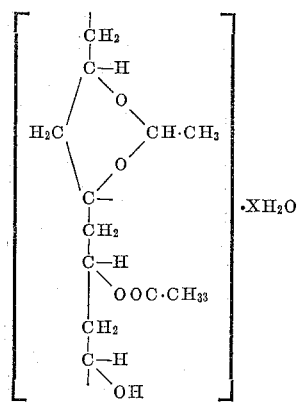

This compound has already been mentioned under the notation "addition compound of partly acetalized polyvinylalcohol with water," in my U.S.A. Patent No. 2,710,274 as well as in my publication "Hall for Speaking About Ceramics and Enamel" 91 (1958) No. 17, page 5 § 2. The hemiacetal which after filtration is still showing a water content of about 50% is now dissolved in such a quantity in a mixture of 70 parts by weight of water and 30 parts by weight of methyl alcohol (methanol) by means of continuous stirring that the solution is showing a dry content of 20% (viscosity, measured by the viscosimeter of Höppeler about 24,000 cp.).

In 100 parts by weight of this solution are introduced successively under cooling 6 parts by weight of calcium bromide and 8 parts by weight of lithium chloride (both dehydrated) as well as 4 parts by weight of urea, which are stirred until a complete solution is attained. The addition of urea is known from my aforesaid publication in the "Hall for Speaking About Ceramics and Enamel" and serves, as already explained, for the shifting of the transition temperature, i.e. the temperature at which the decomposition of the addition compound is taking place to higher temperatures. The solution is then entirely degased by evacuating.

A carrier-foil consisting of polyvinylchloride or polyterephthalacidglycolester is now covered with the solution by a layer in the known manner by means of spraying and spreading in such a way that the result is a film-thickness of about 0.1–0.2 mm. After the film has been dried by passing the foil through a drying oven, it is stored immediately hereafter at a room temperature for about 24 hours, becoming thus slightly adhesive owing to the absorption of water from the atmosphere. It will then be united in the cylinder press with an acetylcellulose foil (thickness about 0.01 mm.).

The foil thus obtained is clear transparent at room temperature, whereat it is white opaque in case of sun-radiation.

*Execution Example 2*

6 parts by weight of lithium bromide together with 5 parts of lithium chloride are dissolved under cooling in 100 parts by weight of the above obtained solution of the hemiacetal. A carrier foil consisting of polyterephthalacidglycolester is covered by a layer of this solution. After the layer has been dried it will be varnished with a solution of acetylcellulose in acetone or in a solution of polyacrylacidester in ethylacetate in such a way that the covering layer which is permeable to water vapor shows a thickness of about 0.1 mm. After a long-continued storage the layer will become active by the absorption of water from the atmosphere effected by the upper covering layer. The foil thus obtained is clear transparent at room temperature, while it is opaque in case of sun radiation.

Execution Example 3

4 parts by weight of calcium bromide and 4 parts by weight of calcium chloride (both dehydrated) as well as 1 part by weight of urea are introduced in the indicated succession into 100 parts by weight of the hemiacetal solution obtained as above under stirring until the solution is complete. For the rest, the mode of proceeding is that of the Execution Examples 1 and 2. The result is a foil, which is clear transparent at a temperature below about 5° C., whereas it will get a white hue above this temperature. The transition point can also be varied in this case in the well known manner within certain limits by an addition of more or less urea.

Execution Example 4

40 parts by weight of the hemiacetal obtained as per Execution Example 1 with a water content of about 50% are cooled down to about 8° C. and kneaded in a kneading-machine of this temperature with 6 parts of lithium nitrate and 4 parts by weight of lithium chloride as well as 3 parts by weight of urea until a complete homogeneous mass is obtained. Under further kneading there are then added 60 parts by weight of water. A carrier foil of polyvinylchloride (thickness about 0.2 mm.) will then receive such a layer that the resulting film thickness will be about 0.1 mm. After drying in the tunnel drier the foil thus obtained will be provided on the layer side with a water vapor permeable covering layer—but insoluble in water—consisting of acetylcellulose. After a prolonged storage the foil will become active. Contrary to the above mentioned foils it will show a transition temperature above 30° C.

Execution Example 5

A disk of polymethacrylacidmethylester is covered with such a layer of the hemiacetal solution gained according to Execution Example 1 that the result is a layer thickness of about 0.2 mm. After drying the film the disk thus treated will be stored 12 hours, whereupon its surface will show a slightly glutinous condition owing to the absorption of moisture. The layer side of the foil receives then a layer with a monomer of a selfpolymerising acryl resin in such a way that after the polymerisation originates a covering solid layer of about 0.15 mm. A synthetic pane of glass is thus obtained, which can be used as protection against the sun instead of silicate panes of glass.

What is claimed is:

1. A multi-layer light transmitting construction exhibiting reversibly variable light permeability in dependence on temperature and light conditions, said construction essentially consisting of an intermediate layer of a complex compound formed from partially acetalized polyvinyl alcohol, water and at least two water soluble inorganic hydrate salts selected from the group consisting of the chlorides, bromides, iodides and nitrates of lithium, calcium and magnesium, said two salts having different anions, said two hydrate salts being present in a concentration in said complex compound sufficient so that the average partial pressure of the water vapor in the complex compound is always below the average partial pressure of the water vapor of the ambient atmosphere, a first light transmitting and water-insoluble cover layer covering one side of said intermediate layer, and a second light transmitting and water-insoluble cover layer covering the opposite side of said intermediate layer, said first and second cover layers being made from a plastic material, at least one of said first and second cover layers being permeable to water vapor.

2. A construction, as claimed in claim 1, wherein said complex compound comprises a reducing agent.

3. A construction, as claimed in claim 1, wherein at least one of said first and second cover layers is flexible and capable of being pulled off from said intermediate layer.

4. A construction, as claimed in claim 1, wherein at least one of said first and second cover layers is made of a synthetic resin selected from the group consisting of cellulose acetate, polyvinyl acetate, polyterephthalic acid glycol ester, polyvinyl chloride and mixed polymerizates of polyvinyl chloride and polyvinyl acetate.

5. A multi-layer light transmitting construction exhibiting reversibly variable light permeability in dependence on temperature and light conditions, said construction essentially consisting of an intermediate layer of a complex compound formed from partially acetalized polyvinyl alcohol, water and at least two water-soluble hydrate salts selected from the group consisting of the chlorides, bromides, iodides and nitrates of lithium, calcium and magnesium, said two salts having different anions said two hydrate salts being present in a concentration in said complex compound sufficient so that the average partial pressure of the water vapor in the complex compound is always below the average partial pressure of the water vapor of the ambient atmosphere, said complex compound being furthermore admixed with an alkaline agent to render the complex compound at least neutral, a first light transmitting and water-insoluble cover layer covering one side of said intermediate layer, and a second light transmitting and water-insoluble cover layer covering the opposite side of said intermediate layer, said first and second cover layers being made from plastic material, at least one of said first and second cover layers being permeable to water vapor.

6. A method of preparing a light transmitting construction exhibiting reversibly variable light permeability in dependence on temperature and light conditions, which comprises extruding a complex compound essentially consisting of partially acetalized polyvinyl alcohol, water and at least two water-soluble inorganic hydrate salts having different anions and selected from the group consisting of the chlorides, bromides, iodides and nitrates of lithium, calcium and magnesium into a foil-like structure and coating the opposite sides of the foil thus obtained with light-transmitting water-insoluble cover layers, at least one of said cover layers being permeable to water vapor.

References Cited by the Examiner

UNITED STATES PATENTS

| | | | |
|---|---|---|---|
| 2,148,062 | 2/1939 | Esselen et al. | 161—199 XR |
| 2,436,433 | 2/1948 | Jebens | 117—138.8 XR |
| 2,524,286 | 10/1950 | Dreyer | 156—100 XR |
| 2,710,274 | 6/1955 | Kuehl | 161—199 |
| 2,756,171 | 7/1956 | Thomas | 161—409 XR |
| 2,892,383 | 6/1959 | Walworth et al. | 260—91.3 XR |
| 3,019,131 | 1/1962 | Haas et al. | 117—138.8 XR |
| 3,051,659 | 8/1962 | Troelstra | 252—317 |

ALEXANDER WYMAN, *Primary Examiner.*

JACOB STEINBERG, *Examiner.*